(12) United States Patent
Fong et al.

(10) Patent No.: US 10,917,849 B2
(45) Date of Patent: Feb. 9, 2021

(54) RADIO FREQUENCY (RF) POWER DETECTOR FOR ANTENNA MODE DETECTION

(71) Applicant: PPIP LLC, Tempe, AZ (US)

(72) Inventors: Michael Fong, Tempe, AZ (US); Neric Hsin-wu Fong, Tempe, AZ (US); Teddy David Thomas, Bedford, NH (US)

(73) Assignee: PPIP, LLC, Tempe, AZ (US)

( * ) Notice: Subject to any disclaimer, the term of this patent is extended or adjusted under 35 U.S.C. 154(b) by 0 days.

(21) Appl. No.: 16/409,493

(22) Filed: May 10, 2019

(65) Prior Publication Data

US 2019/0349861 A1 Nov. 14, 2019

Related U.S. Application Data

(60) Provisional application No. 62/671,307, filed on May 14, 2018.

(51) Int. Cl.
| | |
|---|---|
| *H04W 52/02* | (2009.01) |
| *H04M 1/725* | (2021.01) |
| *H04W 4/80* | (2018.01) |
| *H04B 17/318* | (2015.01) |
| *H04W 24/08* | (2009.01) |

(52) U.S. Cl.
CPC ...... *H04W 52/0251* (2013.01); *H04B 17/318* (2015.01); *H04M 1/72577* (2013.01); *H04W 4/80* (2018.02); *H04W 24/08* (2013.01)

(58) Field of Classification Search
CPC ...... H04L 43/16; H04L 1/0036; H04W 24/08; H04W 74/08; H04W 16/14; H04W 84/12; H04W 88/10; H04W 88/06; H04W 72/1215; H04W 28/04; H04B 17/318
See application file for complete search history.

(56) References Cited

U.S. PATENT DOCUMENTS

| | | | | |
|---|---|---|---|---|
| 10,104,692 | B2* | 10/2018 | Khawer | H04W 74/0816 |
| 2012/0314598 | A1* | 12/2012 | Sadek | H04W 16/14 |
| | | | | 370/252 |
| 2016/0173361 | A1* | 6/2016 | Somasundaram | H04W 24/08 |
| | | | | 370/328 |
| 2017/0353975 | A1* | 12/2017 | Khawer | H04W 74/0816 |

* cited by examiner

*Primary Examiner* — Jung Liu
(74) *Attorney, Agent, or Firm* — Fernando & Partners, LLP

(57) ABSTRACT

In accordance with some embodiments, an apparatus for privacy protection includes a housing arranged to hold a second device, a local communication device at least partially supported by the housing, and a controller, where the apparatus is associated with a radio frequency (RF) power detector. The RF power detector monitors energy emitted from one or more antennas of the second device in response to determining that the second device indicates that the second device has transitioned from a first mode of operation to a second mode of operation. The apparatus further establishes a communication channel between the apparatus and the second device, and obtains, through the communication channel, a communication status of the second device. The apparatus can then report compromise of the second device upon determining that a discrepancy between the communication status and the energy emission.

20 Claims, 8 Drawing Sheets

US 10,917,849 B2

RADIO FREQUENCY (RF) POWER DETECTOR FOR ANTENNA MODE DETECTION

PRIORITY CLAIM

This application claims priority to U.S. provisional patent application No. 62/671,307 filed on May 14, 2018, the contents of which are hereby incorporated by reference.

TECHNICAL FIELD

This relates generally to the field of privacy protection, and more specifically to an apparatus for detecting radio frequency (RF) power.

BACKGROUND

Many enterprises invest heavily on private network infrastructure. Outside the private networks, however, enterprises often do not have much visibility and lack control of network activities, e.g., the network activities in cellular networks or in networks provided by public WiFi hotspots. Moreover, many smart devices used by employees are produced by some manufacturers that have a closed ecosystem, and software on such smart devices prevent enterprises from monitoring. In order to gain network visibility, some enterprises rely on Enterprise Mobility Management (EMM) software installed on smart devices. However, once a smart device is comprised, data gathered by EMM may not be trustworthy. As such, enterprises cannot solely rely on EMM to accurately detect potential threats. Additionally, many smart devices do not have a switch to quickly cease operation. Thus, even if a potential threat is detected, the enterprises cannot stop spread of the threat in a timely fashion.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
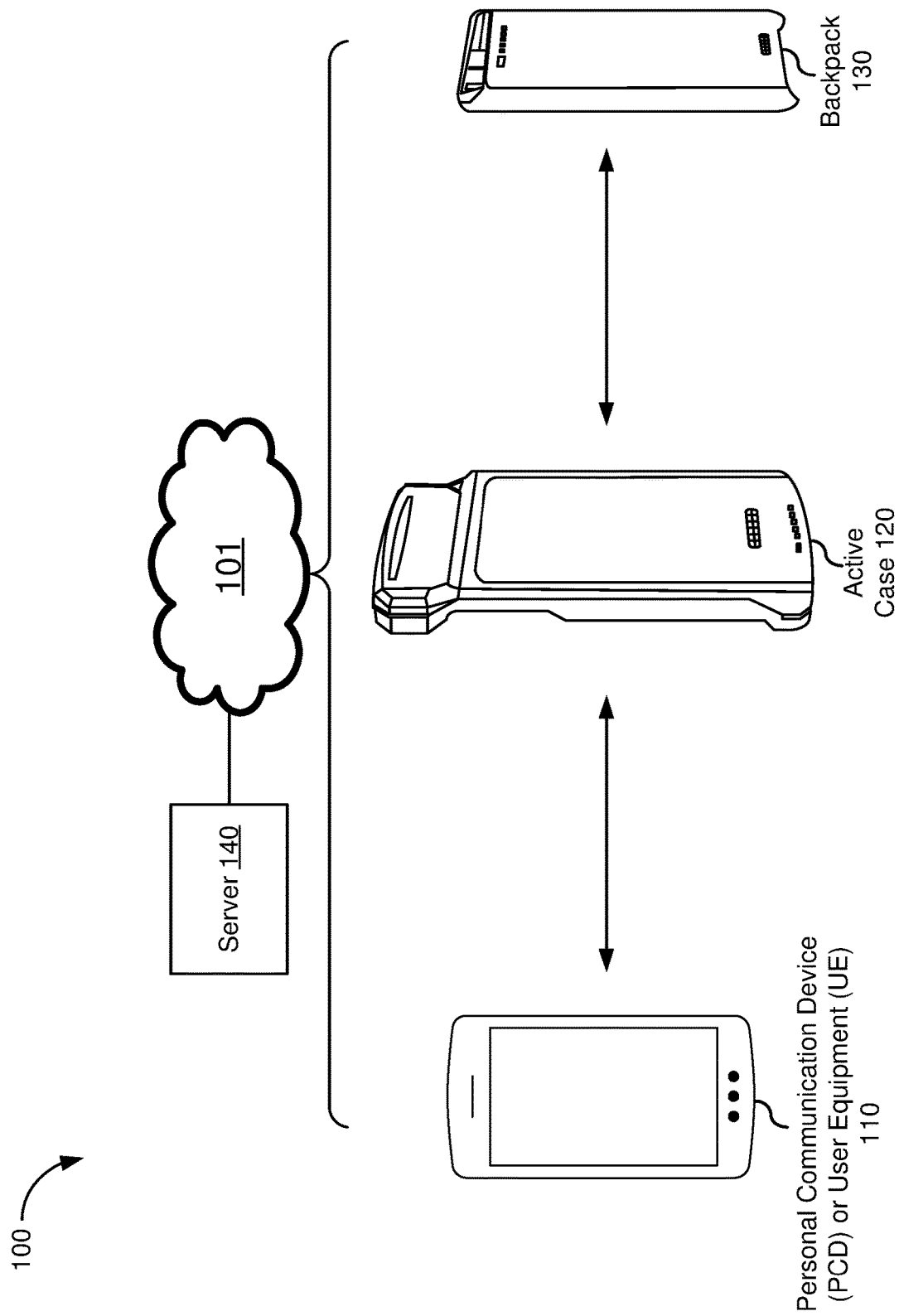
FIG. 1 is a block diagram of an exemplary radio frequency (RF) emitter detection system in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus (also known as a smart case, a safe case, a secure case, an active case, an active base, or a case) that protects a device (e.g., a smart device, tablet, wearable etc.). When the device is compromised, the device may report false status. For example, user interfaces of the device may indicate that the antennas on the device have been turned off (e.g., in an airplane mode where RF emitters including cellular, WiFi, and Bluetooth are disabled), while in fact the comprised device still wirelessly transmits data in the background. In accordance with embodiments described herein, an RF power detector is included in the smart case and/or is attached to the smart case, so that the RF power detector independently measures RF signals and accurately reports the signal power.

In some embodiments, the RF power detector is enabled during the airplane mode to monitor RF emission. When the RF power detector measures signal power above a threshold, it wakes up a communication channel (e.g., BLE) between the smart case and the phone. Through the communication channel (e.g., the BLE running), the smart case can request the phone to report on its communication status, e.g., whether the phone is in the airplane mode. If the phone reports that it is in the airplane mode, which is conflicting with the RF emission detected by the RF power detector, the smart case determines that phone has been compromised. Accordingly, appropriate actions are taken to protect the phone, e.g., disabling the RF transmission and/or controlling data path, etc.

Using the RF power detection methods disclosed herein in accordance with various embodiments, the safe case can detect potential threats accurately and proactively protect the user equipment without user intervention. As such, enterprises can utilize the safe case disclosed herein to better control user equipment used in connection with the enterprise network. In some embodiments, when the phone reports that its current status is no longer airplane mode, the active case exits its own airplane mode (e.g., disabling the RF power detector for energy saving) without intermediate user input for improved user experience.

In accordance with some embodiments, a method is performed at an apparatus (e.g., a smart case, a safe case, a secure case, an active case, an active base, or a case) including a housing arranged to hold a second device (e.g., a smart phone, tablet, or wearable etc.), a local communication device at least partially supported by the housing, and a controller, where the apparatus is associated with a radio frequency (RF) power detector. In some embodiments, the method includes monitoring, by the RF power detector, energy emitted from one or more antennas of the second device in response to determining that the second device indicates that the second device has transitioned from a first mode of operation (e.g., non-airplane mode or antennas enabled) to a second mode of operation (e.g., airplane mode or disabling of one or more antennas). In some embodiments, the second mode of operation is different from the first mode of operation in that the one or more antennas of the second device are disabled in the second mode of operation as compared to the first mode of operation. In some embodiments, the method further includes establishing a communication channel (e.g., BLE) between the apparatus and the second device. In some embodiments, the method includes obtaining, through the communication channel, a communication status of the second device, where the communication status indicates that the second device is in the second mode of operation. Additionally, the method includes reporting compromise of the second device in accordance with a determination that the communication status indicates that the second device in the second mode of operation and a determining that the energy has been emitted by the one or more antennas of the second device.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of an RF emitter detection system 100 is depicted, in accordance with some embodiments. In some embodiments, the RF emitter detection system 100 includes a personal communication device 110 (also known as a user equipment (UE) or a user device), an active case 120 (also known as an active base, a case, an active case, or a secure case), and an apparatus 130 (also known as a backpack or a supplemental functional device) connectable to a server 140 through a network 101. In some embodiments, the active case 120 includes a housing arranged to hold the personal communication device or the user equipment 110 (e.g., smartphone, wearable, tablet, etc.), as will be shown in FIG. 2. In some embodiments, the housing includes a plurality of components mateable with another. In other words, the plurality of components, once mated with one another, form a housing assembly to hold the personal communication device 110. The housing assembly allows a user to insert the personal communication device 110 into the active case 120 for more protection of work-related sensitive information (e.g., in a work mode) or take the personal communication device 110 out of the active case 120 for less monitoring of personal communication by enterprise (e.g., in a personal mode).

Figure 2:
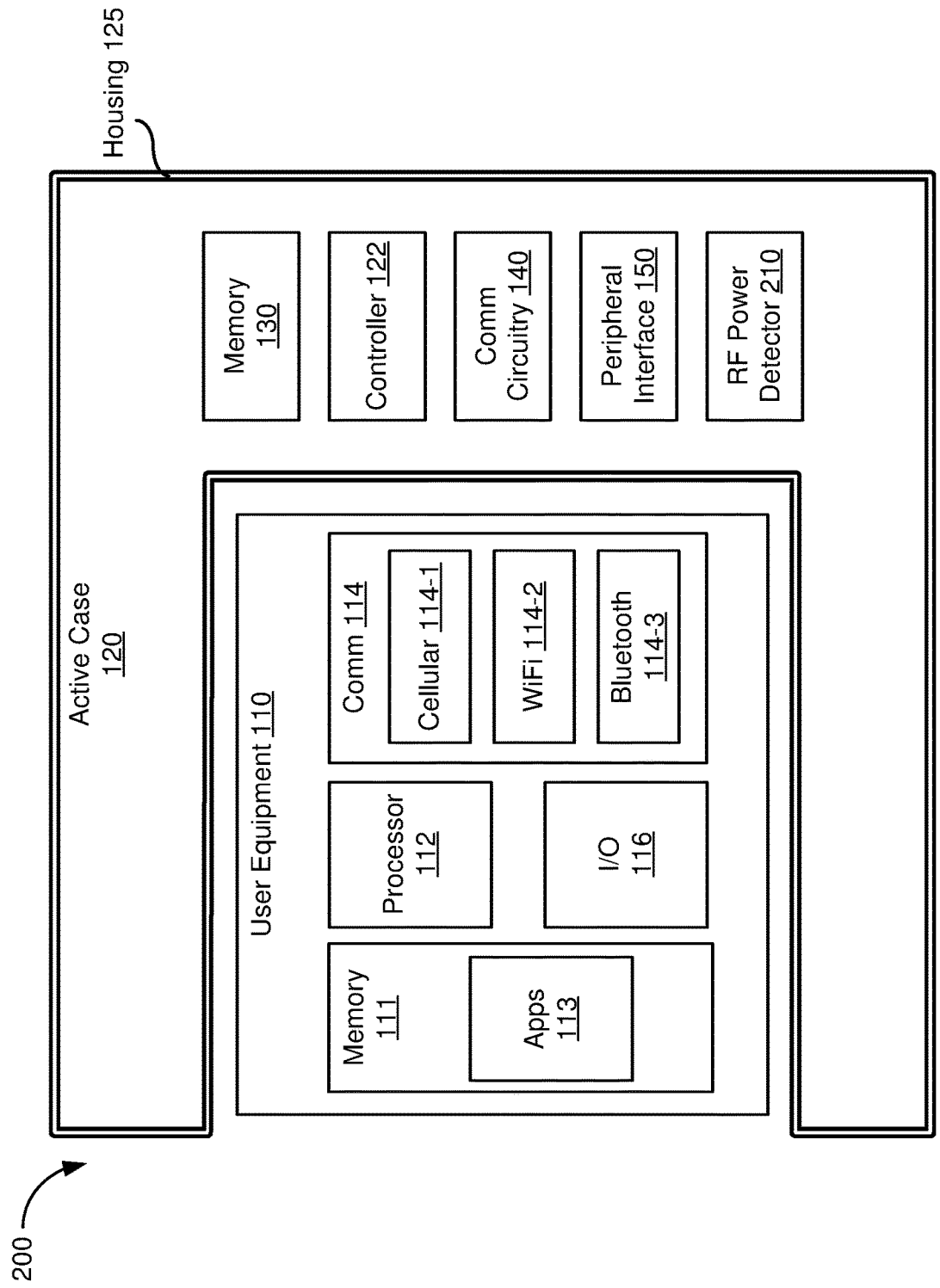
FIG. 2 is a block diagram of an exemplary active case holding a user equipment in accordance with some embodiments.

The active case 120 can have one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially support and hold the personal communication device 110, e.g., a partial enclosure as shown in FIG. 2 or a whole enclosure encapsulating the personal communication device 110. When in certain position(s), the housing, along with other components of the active case 120, protects the personal communication device 110 against tracking or spying, e.g., by audio jamming, camera covering, and/or RF shielding, etc. When the one or more moveable components of the housing assembly are in certain other position(s) (e.g., hood slid up), a user can take the personal communication device 110 out of the housing and place the personal communication device 110 in a non-protected mode.

In some embodiments, the active case 120 includes a peripheral interface (e.g., a backpack interface) to connect to a supplemental functional device 130 (e.g., a backpack). The supplemental functional device 130, as described herein, is a device connectable to the user equipment 110 through the active case 120 and provides supplemental functional functions to the user equipment 110. The peripheral interface of the active case 120 is connectable to peripheral interface of the supplemental functional device 130, so that a communication channel between supplemental functional device 130 and the personal communication device 110 can be established.

In some embodiments, the housing of the active case 120 at least partially supports the peripheral interface of the active case 120. For example, the peripheral interface can include a number of connectors (e.g., contact pins or contact pads) connectable to the supplemental functional device 130. In some embodiments, the connectors are affixed to the housing of the active case 120 and at least partially supported by the housing of the active case 120. The connectors are mateable to the peripheral interface of the backpack 130. In some embodiments, the peripheral interface of the active case 120 is wholly supported by the housing of the active case 120, such that the peripheral interface is integrated with or embedded in the housing surface. In such embodiments, connectors from the backpack 130 can be plugged into the peripheral interface of the active case 120 in order to connect the backpack 130 to the active case 120. In some embodiments, the peripheral interface of the active case is operable to communicate with the supplemental functional device 130 via a physical channel including communication connectors. The physical channel forms a secure channel for communication between the active case 120 and the backpack 130.

In some embodiments, the peripheral interface of the active case 120 and/or the backpack 130 is a wireless interface that includes a wireless modem operable to communication wirelessly. For example, the active case 120 can connect to a wireless communication enabled backpack device 130 through a wireless peripheral interface or through a wireless modem of the active case 120. As such, a wireless communication enabled backpack 130 can communicate with the active case 120 without being in contact with the housing of the active case 120 or physically connected to the peripheral interface of the active case 120.

In some embodiments, when paired with the active case 120 and the personal communication device 110, the supplemental functional device 130 is operable to provide supplemental functionalities to the personal communication device 110. For example, the supplemental functional devices can detect RF energy emission, sniff uplink TCP/IP transfer, or detect the presence of chemicals or drugs, etc. The additional information collected by the supplemental functional device 130 can be used by the personal communication device 110 and/or the active case 120 for further intrusion detection and privacy protection. In particular, a RF sniffer on the case 120 and/or as the backpack 130 attached to the case 120 can detect in-range RF emitter(s), work with other RF sniffers through the coordination by the server 140 to geolocate, track and map the in-range RF emitters and use the aggregated data from the RF sniffers and/or with external data sources (e.g. FCC cell tower DB, internal or other 3rd party DBs etc.) to assess the in-range RF emitter(s) and report or take action based on the assessment, e.g. detect rogue base station and transmit the rogue station information to the cloud for mapping.

Turning to FIG. 2, a simplified block diagram 200 of the active case 120 as an apparatus holding the personal communication device 110 or the user equipment 110 is depicted, in accordance with some embodiments. Different from a conventional base or case that merely holds a personal communication device, the active case 120 actively monitors and analyzes the personal communication device 110 in order to determine whether the device 110 is a compromised device.

As described above with reference to FIG. 1, in some embodiments, the active case 120 includes a housing 125 arranged to hold the personal communication device 110, a peripheral interface 150 (e.g., a backpack interface) to connect to a supplemental functional device (e.g., the backpack 130, FIG. 1), and one or more communication circuitries 140 coupled to the peripheral interface 150. The peripheral interface 150 connects the supplemental functional device 130 to the active case 120 and the one or more communication circuitries 140 further connects the peripheral interface 150 to the user equipment 110. In some embodiments, the housing 125 at least partially supports the peripheral interface 150 and the one or more communication circuitries 140.

In some embodiments, the one or more communication circuitries 140 includes a personal communication device interface modem (e.g., a WiFi modem, a BT/BLE radio, an infrared radio, an NFC radio, a Lightning® (a registered trademark of Apple Inc., Cupertino, Calif.) connector, etc.) operable to provide a communication channel (e.g., wirelessly or via physical connection) between the peripheral interface 150 and the personal communication device 110. In one direction, the communication channel carries information from the personal communication device 110 to the active case 120 for validation. In the other direction, the communication channel carries information from the supplemental functional device 130 (FIG. 1) via the peripheral interface 150 to the personal communication device 110 in order to supplement the functionality of the personal communication device 110.

In some embodiments, the active case 120 includes a controller 122 coupled to the peripheral interface 150 and the one or more communication circuitries 140. Embodiments of the controller 122 include hardware, software, firmware, or a combination thereof. In some embodiments, the controller 122 is operable to manage the communication channel between the personal communication device 110 and the backpack 130 (FIG. 1) and through the one or more communication circuitries 140 and the peripheral interface 150. In other words, the controller 122 manages a segment of the communication channel between the personal communication device 110 and the case 120 through the management of the one or more communication circuitries 140, and the controller 122 manages a segment of the communication channel between the case 120 and the backpack 130 (FIG. 1) through the management of the peripheral interface 150.

In some embodiments, the active case 120 includes an RF power detector 210 that detects the power level of RF energy. Based on the power level and the status of one or more antennas of the personal communication device 110 that is reported by the personal communication device 110, the active case 120 determines whether the personal communication device 110 has been compromised.

Though not shown in FIG. 2, in some embodiments, the active case 120 includes a power supply that supplies power to the peripheral interface 150, the one or more communication circuitries 140, and the controller 122. In some embodiments, the power supply includes at least one of a battery, a charging socket, a USB connector, a power plug, and/or a power socket. In some embodiments, the power supply includes a connector for a battery.

In some embodiments, the personal communication device 110 held by the active case 120 includes a processor 112, one or more communication devices 114, an input/ output interface 116, sensors, memory 111, and applications 113, which further includes instructions stored in the memory 111 and executed by the processor 112. In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 1 below may not be mandatory and thus some may be omitted in certain embodiments. Additionally, some embodiments can include further or different components, devices or elements beyond those illustrated in and described with respect to FIG. 1.

In some embodiments, the processor 112 is coupled to the one or more communication devices 114 in order to control the communication using the communication device 114, in accordance with some embodiments. In addition to controlling communication, the processor 112 processes data and executes the applications 113, in accordance with some embodiments. In some embodiments, the processor 112 includes one or more chips chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like. Although illustrated as a single processor, it will be appreciated that the processor 112 can comprise a plurality of processors. Each of the plurality of processors communicate with each other and collectively perform one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the application(s) 113) to be executed by the processor 112. In some embodiments, the memory 111 exchanges information with one or more of the processor 112, the input/output interface 116, the one or more communication devices 114, or sensors via a bus. In some embodiments, the applications 113 stored in the memory 111 include an application for exchanging information between the user equipment 110 and an external electronic device (e.g., the active case 120). The information exchange includes, for example, transmitting information obtained by the one or more communication devices 114 and/or sensors to an external electronic device (e.g., the active case 120) or receiving information from the external electronic device, e.g., the information gathered by the supplemental functional devices 130 (FIG. 1) and relayed by the active case 120 via the peripheral interface 150 and the one or more communication devices 140.

In some embodiments, the input/output interface 116 provides a channel for input/output data between the processor 112 and input/output peripheral devices, such as a display, a keyboard, a mouse, a pen, microphones, cameras, and/or speakers of the user equipment 110. In some embodiments, the peripheral devices are connected to the input/output interface 116 wirelessly, e.g., via the one or more communication devices 114.

In some embodiments, the one or more communication devices 114 connect the user equipment 110 and an external electronic device wirelessly or through a wired connection. In some embodiments, the external electronic device is the active case 120, such that the one or more communication devices 114 connect to the active case 120 wirelessly or through a wired communication. The wireless communication includes at least one of, for example, WiFi 114-2 (e.g., IEEE 802.11a, IEEE 802.11b, IEEE 802.11g, IEEE 802.11n, and/or IEEE 802.11 ac), Bluetooth (BT)/Bluetooth Low Energy (BLE) 114-3, Near Field Communication (NFC), Global Positioning System (GPS), and/or cellular communication 114-1, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

Though not shown in FIG. 2, in some embodiments, the user equipment 110 includes sensors, such as one or more accelerometers, gyroscopes, and/or magnetometers (e.g., as part of an inertial measurement unit (IMU)) for obtaining information concerning the position (e.g., altitude) of the user equipment 110, light sensors, or acoustic sensors. In some embodiments, the sensors are coupled to the input/output interface 116, such that the information collected by the sensors is passed to the processor 112 by the input/output interface 116 for further processing. For example, the input device camera uses light sensors for light sensing. In some embodiments, the sensors are coupled to the communication device 114, such that the information collected by the sensors is transmitted to another device (e.g., the active case 120) for validation. In some embodiments, the sensor is coupled to the power supply (e.g., a battery) of the user equipment 110 for obtaining the power level of the user equipment 110.

Figure 3A:
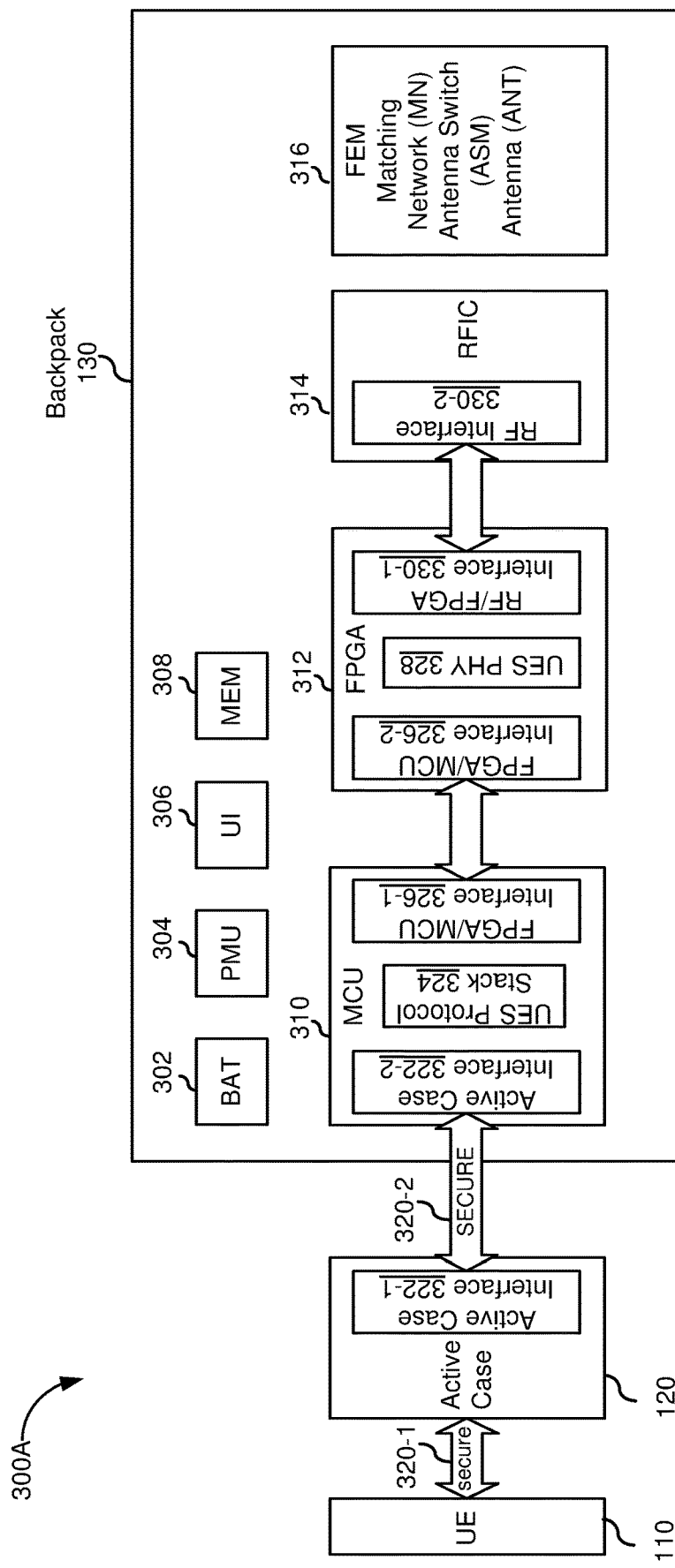
FIG. 3A is a block diagram of an exemplary backpack as an RF power detector in accordance with some embodiments.

FIG. 3A illustrates an exemplary block diagram 300A of the backpack 130 as an RF power detector (or user equipment sniffer (UES)) connectable to the active case 120, in accordance with some embodiments. In some embodiments, the backpack 130 includes a battery 302, a power management unit (PMU) 304, a user interface (UI), a memory 308, a microcontroller (MCU) 310, a Field Programmable Gate Arrays (FPGA) 312, a Radio Frequency Integrated Circuit (RFIC) 314, and a frontend module (FEM) 316. It should be noted that at least some of the RF power detector functions can be integrated into the active case 120 in some embodiments. Thus, the RF power detector can be part of the active case 120 (e.g., the RF power detector 210 in FIG. 2), the backpack 130, or the combination of the active case 120 and the backpack 130. In other words, the UES can refer to the active case 120, the backpack 130, or the combination of the active case 120 and the backpack 130. For example, at least part of the functions performed by the MCU 310, the FPGA 312, the RFIC 314, and/or the FEM 316 can be performed by the controller 122, the one or more communication circuitries 140, and/or the RF power detector 210 on the active case 120 shown in FIG. 2.

In some embodiments, the MCU 310 is connectable to the active case 120 through a secure channel 320, including the secure channel 320-2 established by an Object Linking & Embedding (OLE) interface as the active case interface 322-1 on the active case 120 and the active case interface 322-2 on the MCU 310. In some embodiments, a peripheral interface (e.g., backpack bus or a wireless interface to a wireless capable backpack device) connects the MCU 310 to the active case 120, e.g., via physical connectors or wireless modem connectors). The secure communication channel 320 is further described below with reference to FIG. 4.

In some embodiments, the active case 120 is operably connectable to the personal communication device 110 and the peripheral interface, which forms the secure communication channel 320, obtains uplink communication signals and downlink communicate signals of the personal communication device 110 through the active case 120. As such, the MCU 310 obtains information associated with the personal communication device 110 through the peripheral interface. In some embodiments, the MCU 310 is coupled to the FPGA 312 through an FPGA/MCU interface 326-1. The MCU 310 executes instructions implementing a protocol stack 324 for context-based data processing and decision making of RF detection. An exemplary protocol stack is shown and described below with reference to FIG. 6. Further, the MCU 310 handles signaling and control, crypto communication, secure communication, and/or over-the-air (OTA) firmware update for the backpack 130. In some embodiments, the MCU 310 scans an RF spectrum of the communication signal that is received by the RF detection device (e.g., the RFIC 314) in order to identify communications associated with the personal communication device 110, the active case 120, and/or the backpack 130.

In some embodiments, the FPGA 312 is coupled to the MCU 310 through an FPGA/MCU interface 326-2 and is coupled to the RFIC 314 through an RF/FPGA interface 330-1. The FPGA 312 provides high speed data processing and digital filtering. In some embodiments, the FPGA 312 is operable to perform physical layer analysis 328, compare the energy detected by the RFIC 314 with a threshold in order to identify at least one energy burst, and evaluate whether the at least one energy burst matches a signal protocol signature of the signal protocol, as will be described in detail below with reference to FIG. 3B.

In some embodiments, the RFIC 314 is coupled to the FPGA 312 through an RF interface 330-2. The RFIC 314 performs data conversion between RF and digital signals and is operable to detect energy carrying a communication signal to or from the personal communication device 110 and/or the active case 120. When in a receiving mode, the RFIC 314 allows the backpack 130 to perform its normal functions, e.g., RF signal detection etc. When in a transmitting mode, the RFIC 314 provides RF isolation of the user equipment 110, the active case 120, and/or the backpack 130. In some embodiments, the backpack 130 includes a remote communication device, operable to transmit wirelessly to a remote secure server. In some embodiments, the remote communication function is performed at least in part by the RFIC 314.

In some embodiments, the FEM 316 can detect RF signals and/or perform electromagnetic simulation, e.g., simulating RF performance, obtaining or setting RF characteristics as a function of carrier frequency, etc. In some embodiments, the FEM 316 includes at least one of an antenna tuner (also known as a matching network (MN)), an antenna switch (ASM), and/or an antenna (ANT) for wireless communication and/or electromagnetic simulation.

As explained above with reference to FIG. 2, the active case 120 has a housing 125 that is arranged to received and hold the user equipment 110. Further, the backpack 130 can be attached to the active case 120. As such, at least parts of the UES (e.g., the active case 120 and/or the backpack 130) are in close distance to the user equipment 110, e.g., in the range of millimeters. Accordingly, different from conventional threat detection systems and methods that detect and monitor the user equipment 110 from a distance, the UES can detect potential threats faster and the threat detection is more accurate, e.g., detecting a surge of RF energy when the user equipment 110 falsely reports an airplane mode. Further, the UES (e.g., the active case 120) is capable of controlling sensor paths and/or communication paths associated with the user equipment 110, e.g., disabling the sensors and/or communication devices on the user equipment 110 and/or re-directing the information from the user equipment 110. As such, the UES can quickly react to the accurate threat detection, e.g., shutting down the user equipment 110, stopping the communication of the user equipment 110 with a remote source (e.g., a remote device and/or a remote server, etc.), erasing sensitive data from the user equipment 110, masking sensor data, etc.

Figure 3B:
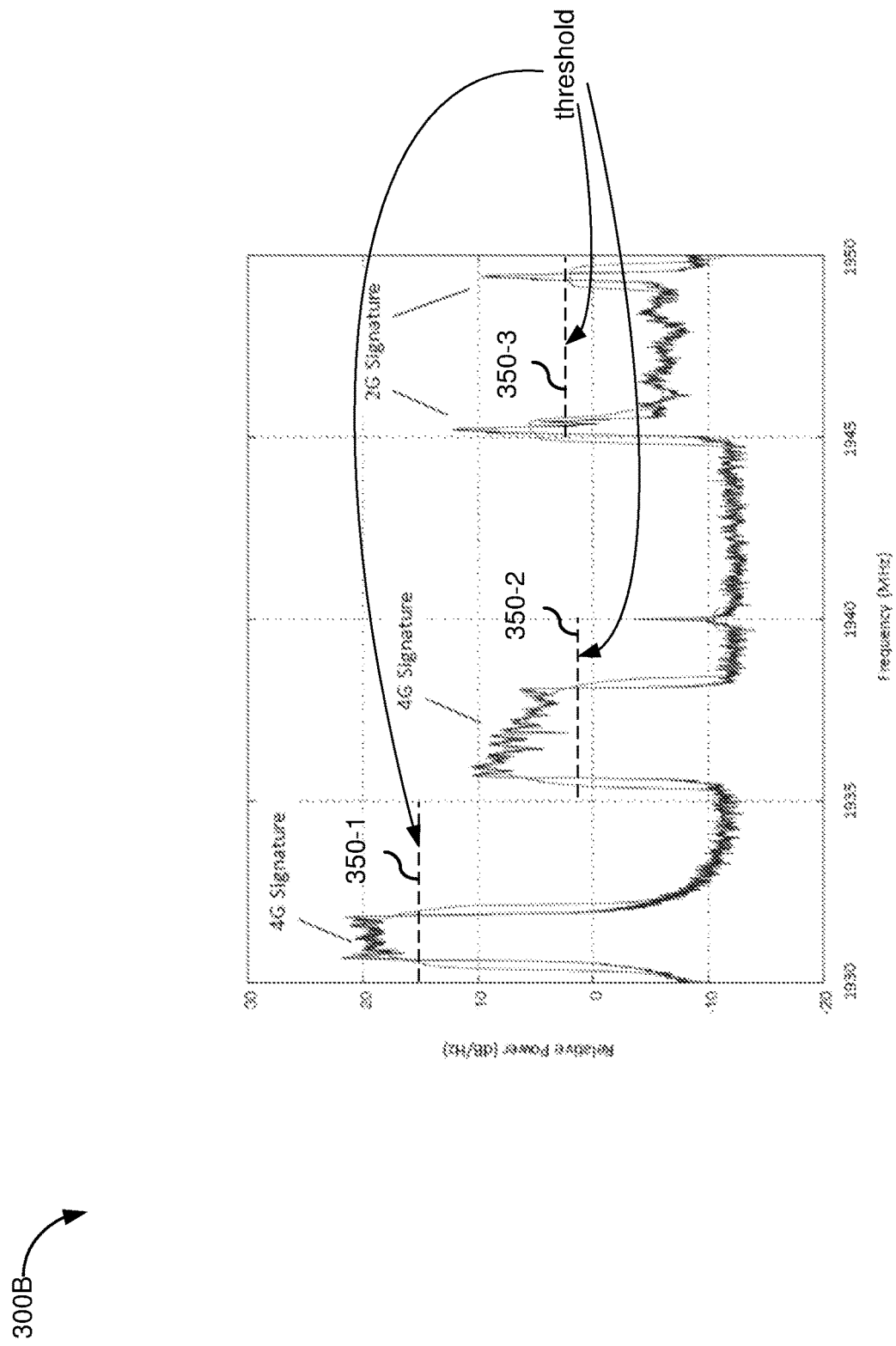
FIG. 3B illustrates RF energy signature patterns in accordance with some embodiments.

FIG. 3B illustrates exemplary RF energy signature patterns 300B in accordance with some embodiments. In some embodiments, the RF power detector can detect waveforms of the RF energy (e.g., whether 2G, 3G, or 4G), including power level and duration of the signal burst. In particular, the UES (e.g., the active case 120 in FIG. 2 and/or the backpack 130 in FIG. 3A) can detect waveforms of pulsed wireless signals as shown in FIG. 3B. For example, the UES can detect a waveform between 1945 MHz and 1950 MHz in a shape of a dual tower. Upon comparing with a waveform signature of 2G signals, the UES can determine that the waveform matches the 2G waveform signature between the frequency range of 1945-1950 MHz. Accordingly, the UES can determine that the user equipment may be wirelessly communicating with a remote source (e.g., a remote device and/or a remote server, etc.) using 2G protocols. In another example, the UES can detect a waveform with a narrow peak relative power of 20 db/Hz between 1930 MHz and 1935 MHz and/or a waveform with a peak relative power around or below 10 dB/Hz between 1935 MHz and 1940 MHz. Upon comparing with one or more waveform signatures of 4G signals, the UES can determine that the waveform matches the one or more 4G waveform signatures between the frequency range of 1930-1935 MHz and/or 1935-1940 MHz. In some embodiments, one or more pre-determined thresholds, as indicated by the dashed lines, are used for describing the signature patterns associated with various communication protocols, e.g., a first threshold 350-1 for 2G, a second threshold 350-2 for 3G and/or 4G, and a third threshold 350-3 for 4G, etc.

Figure 4:
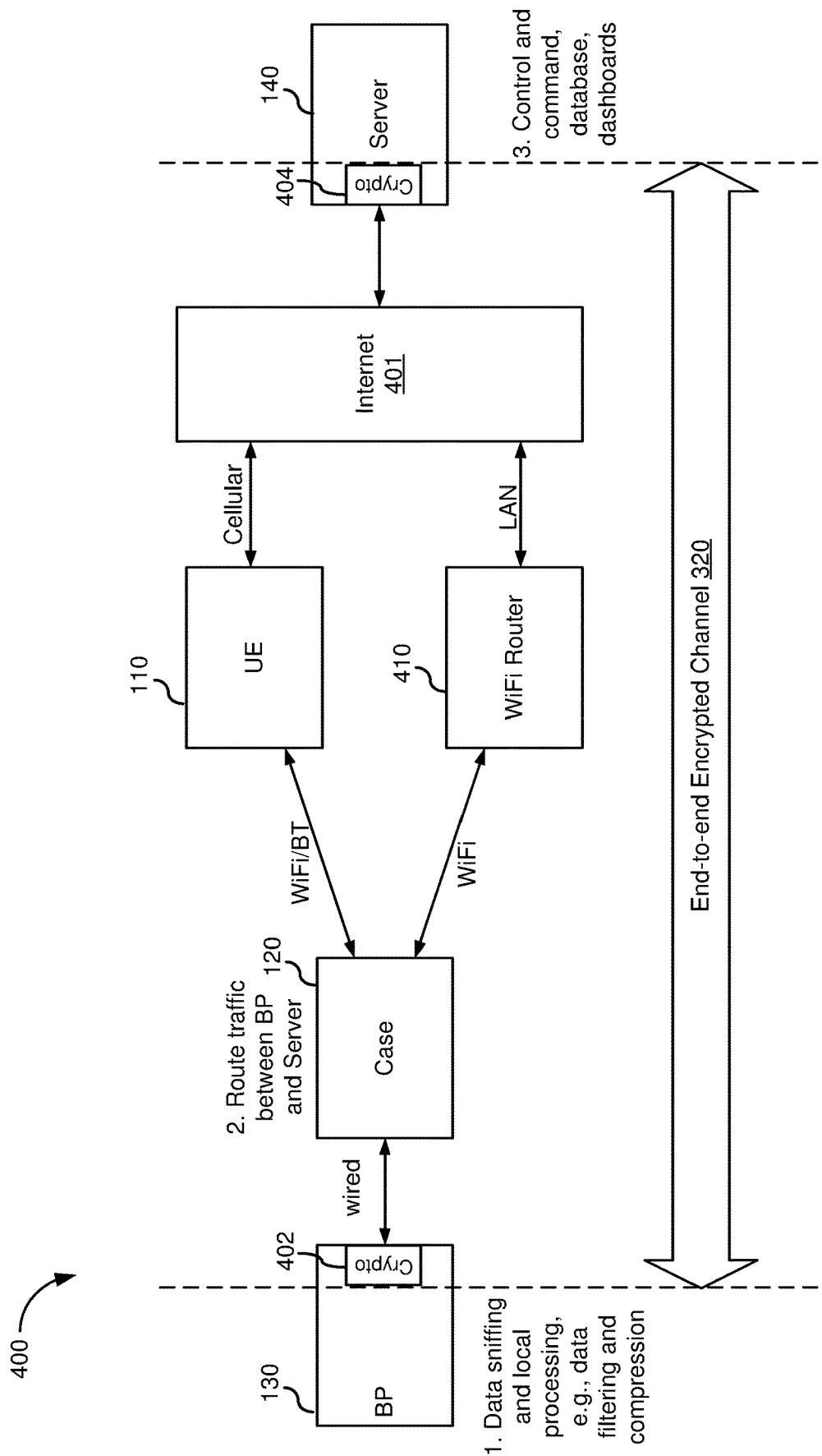
FIG. 4 illustrates an exemplary secure communication channel for RF emitter detection and mapping in accordance with some embodiments.

FIG. 4 illustrates an exemplary threat detection and control system 400 that utilizes a secure communication channel (e.g., the secure communication channel 320) in accordance with some embodiments. In some embodiments, a remote source, e.g., the server 140 which can be a remote electronic device, can facilitate the determination of a potential threat and control the threat spread. In addition to determining the wireless communication protocols based on waveform signatures as shown in FIG. 3B, the server 140 can facilitate the derivation of other characteristics of the wireless communication. In some embodiments, an end-to-end encrypted channel (e.g., the secure communication channel 320) is established between the backpack 130 and the server 140 through the active case 120 and/or user equipment 110 in order to exchange the data for determining the characteristics of the wireless communication. Further, the end-to-end encrypted channel 320 allows the server 140 to remotely control the user equipment 110.

In some embodiments, the backpack 130 utilizes the RFIC 314 (FIG. 3A) and/or the FEM 316 (FIG. 3A) to sniff RF signals from an RF emitter in the vicinity (e.g., the user equipment 110, FIG. 3A) and analyzes the data associated with the RF signal. In some embodiments, the backpack 130 also performs local data processing, such as data filtering and compression. In some embodiments, the backpack 130 encrypts the local data using a crypto unit 402 and exchanges encrypted data with the active case 120 through a wired connection, where the encrypted data includes the data associated with the RF signal. The active case 120 then routes traffic between the backpack 130 and the secure server 140, including transmitting the encrypted data from the backpack 130, where the secure server 140 also has a crypto unit 404 for encryption and decryption.

In some embodiments, the active case 120 communicates with the user equipment 110. For example, as shown in FIG. 2, the active case 120 can obtain the status of the communication devices 114 and can control the communication devices 114 on the user equipment 110 through the coupling with the user equipment 110. Further as shown in FIG. 2, in some embodiments, the active case 120 includes the RF power detector 210 for detecting and analyzing RF signals received by and/or transmitted from the user equipment 110. Accordingly, in case the active case 120 determines that the user equipment 110 wirelessly communicates with a remote source while the user equipment 110 reports that it is in an airplane mode, the active case 120 can promptly disables such wireless communication.

In some embodiments, the active case 120 also communicates with a WiFi router 410, e.g., a WiFi router from a secure WiFi provider. The wireless communication associated with the active case 120 is encrypted and the communication between the user equipment 110 or the WiFi router and the server 140 through the internet 401, regardless of whether the communication is wireless or wired, is also encrypted. As such, in some embodiments, the server 140 controls and commands the active case 120, the backpack 130, and/or the user equipment 110 through the end-to-end encrypted channel 320 and based on information stored in its database and through dashboards.

The end-to-end encrypted channel 320 allows the server 140 to receive reliable RF signal information, which is independently obtained by the backpack 130 and/or the active case 120. Leveraging on the information stored in its database, e.g., RF signal information received through end-to-end encrypted channels 320 from other backpacks and/or active cases, geo-fences, etc., the server 140 can determine whether the RF signal detected by the backpack 130 and/or the active case 120 is an indication of a threat. In the scenario that the active case 120 determines that it is indeed a threat, the server 140 can command the active case 120 and/or the user equipment 110 to cease the wireless communication. In some embodiments, because the active case 120 is capable of communicating with other network equipment, such as the WiFi router 410, the commands and/or updates (e.g., updates of wireless communication protocol signature patterns and/or firmware updates for the active case 120 and/or backpack 130) from the server 140 can reach the active case 120 securely and quickly (e.g., via LAN connection).

Figure 5:
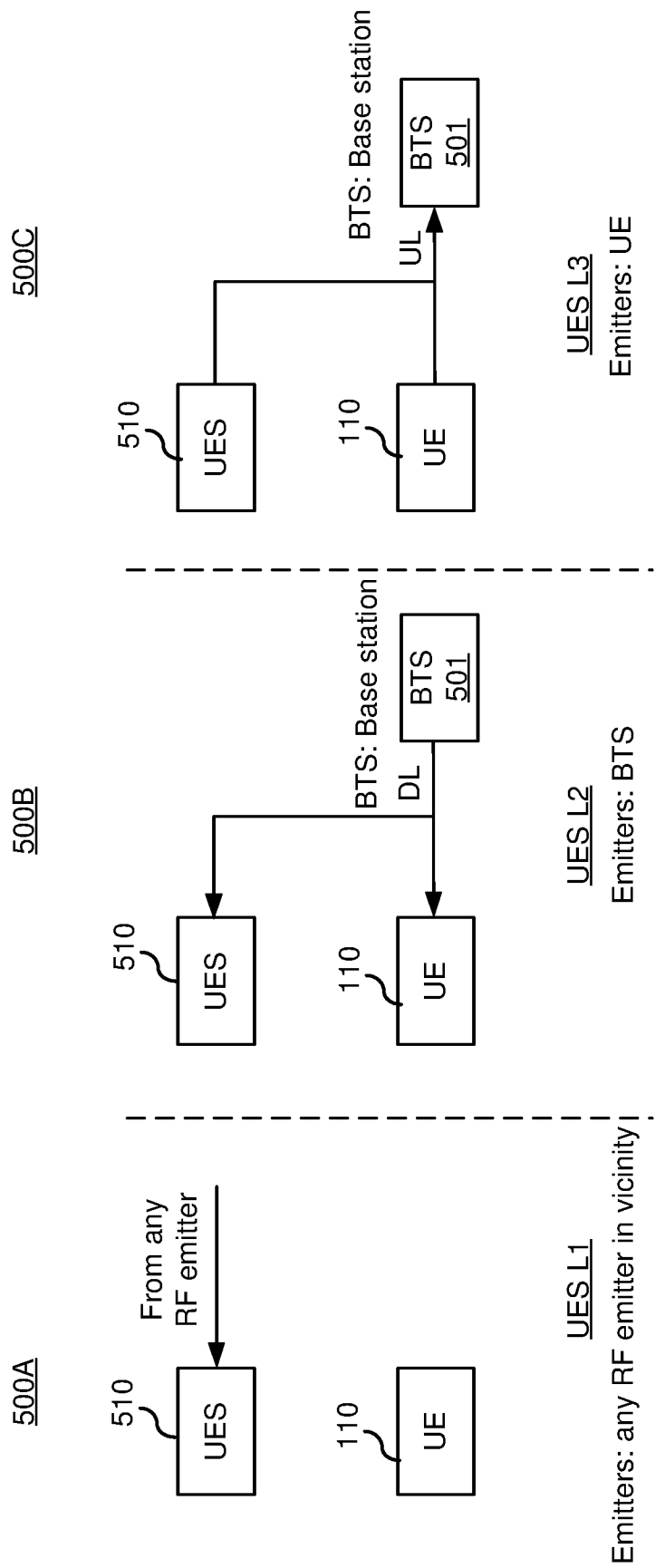
FIGS. 5A-5C illustrate various types of RF signal detection in accordance with some embodiments.

FIGS. 5A-5C illustrate various types of RF signal detection 500A-500C performed by UES 510 (e.g., the RF power detector in FIG. 2 and/or the backpack 130 in FIG. 3A) in accordance with some embodiments. In some embodiments, as shown in FIG. 3A, the MCU 310 and/or FPGA 312 of the backpack 130 scans the RF spectrum detected by the RFIC 314 and identifies signal protocol based on the signal signature patterns shown in FIG. 3B. Further, by sniffing the RF signals, the UES 510 can perform RF signal detection to derive characteristics of wireless communications associated with the detected RF signals.

In some embodiments, as shown in FIG. 5A, a first layer (e.g., UES L1) RF signal detection scans an RF spectrum and identifies signal protocols (e.g., cellular 2G/3G/4G, WiFi, etc.) and identifies any RF emitter in the vicinity, e.g., the user equipment 110, a base station, a WiFi hotspot, etc. During the RF signal sniffing, the UES can identify characteristics, such as the signal protocol (e.g., 2G/3G/4G), frequency, bandwidth, and/or Peak-To-Average Power Ratio (PAPR), etc.

In some embodiments, as shown in FIG. 5B, a second layer (e.g., UES L2) RF signal detection captures LTE downlink (DL) signals and extracts the cell tower parameters. As such, UES L2 RF signal detection can detect emitters that are base stations 501. In other words, when the base stations 501 are in communication with the user equipment 110, the UES 510 can derive characteristics of the base stations 501 based on the detected RF signals.

In some embodiments, as shown in FIG. 5C, a third layer (e.g., UES L3) RF signal detection decodes LTE uplink (UL) signals and performs analysis packet to extract TCP and IP headers for network traffic monitoring. As such, UES L3 RF signal detection can detect emitters that are user equipment 110 and extract information from wireless communications between the user equipment 110 and the base station 501.

Figure 6:
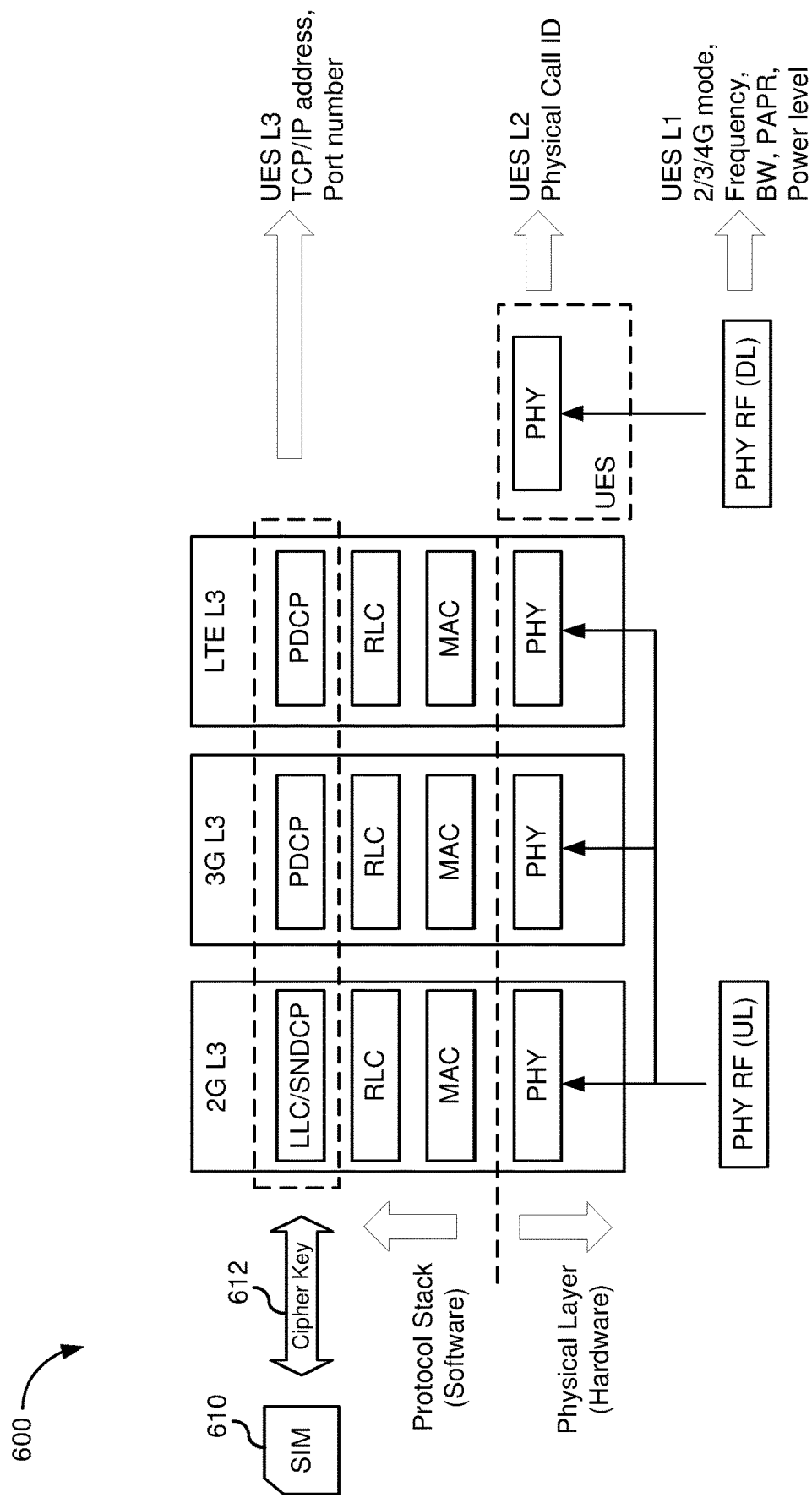
FIG. 6 illustrates an exemplary user equipment sniffer (UES) architecture for wireless communication characteristics extraction in accordance with some embodiments.

FIG. 6 illustrates an exemplary UES architecture 600 for wireless communication characteristics extraction in accordance with some embodiments. As described above with reference to FIG. 5A, through RF signal sniffing, the UES can obtain RF characteristics of RF emitters in the vicinity, such as the signal protocol (e.g., 2G/3G/4G), frequency, bandwidth, and/or Peak-To-Average Power Ratio (PAPR), etc., in UES L1 RF signal detection. Further, through the downlink analysis at the physical level, physical cell ID along with other cell tower parameters can be obtained in UES L2 RF signal detection.

In some embodiments, information of a SIM 610 used by the user equipment 110 (not shown) for wireless communication can be obtained by the active case 120. The retrieval of the SIM card information from the personal communication device 110 is disclosed in U.S. Patent Application No. 62/588,887, titled "Apparatus with Dual Subscriber Identity Module (SIM) Interfaces," which is incorporated by reference in its entirety. In some embodiments, the SIM information obtained by the active case 120 includes a cipher key 612.

In some embodiments, using the cipher key 612, TCP/IP and/or port number for different LTE communications can be obtained in UES L3 RF signal detection. As is known in the art, Sub Network Dependent Convergence Protocol (SNDCP), is part of layer 3 of 2G protocol specification. SNDCP interfaces to the Internet Protocol at the top, and to the 2G-specific Logical Link Control (LLC) protocol at the bottom. Various implementations of SNDCP for 2G support IP as the payload type. Also as is known in the art, PDCP is an abbreviation for Packet Data Convergence Protocol. The PDCP is located in the Radio Protocol Stack on top of the layer 2 protocol, Radio Link Control (RLC) layer, which is further on top of the MAC layer. PDCP provides its services to IP at the UE or to the relay at the base station. In some embodiments, the header compression technique can be based on either IP header compression (RFC 2507) or Robust Header Compression (RFC 3095). If PDCP is configured for No Compression it can send the IP Packets without compression; otherwise it will compress the packets according to its configuration by upper layer and attach a PDCP header and send the packet.

Figure 7:
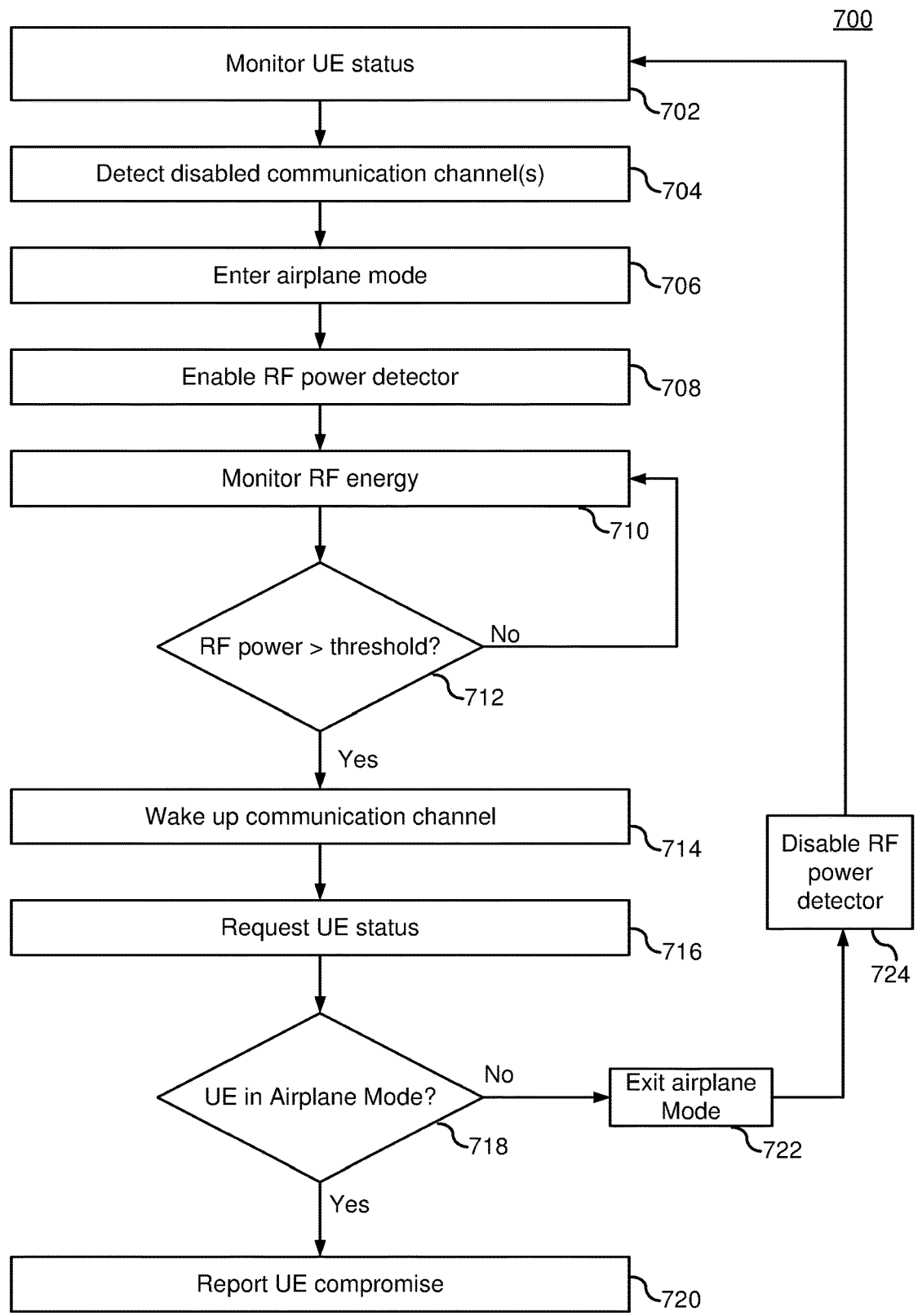
FIG. 7 is a flowchart illustrating an exemplary RF power detection method for antenna mode monitoring in accordance with some embodiments.

FIG. 7 illustrates an exemplary RF power detection method 700 for antenna mode monitoring, in accordance with some embodiments. In some embodiments, the method 700 is performed by a device associated with an RF power detector (e.g., the RF power detector 210 in FIG. 2 and/or the backpack 130 in FIG. 3A). As explained above, if a phone is compromised, the phone may still transmit data wirelessly through RF energy emission even though the user interface of the phone indicates the phone is in an airplane mode (e.g., all RF emitters including the cellular, WiFi, and Bluetooth are disabled and the antennas of these RF emitters are turned off). Leveraging its close proximity and fixed distance to the phone, the RF power detector associated with the smart case 120 and/or the backpack 130 measure RF signals to or from the user equipment and report the signal power level.

The method 700 starts, in block 702, with the active case monitoring the status of the user equipment held by the active case. For example, in FIG. 2, the active case 120 checks through the pairing between the one or more communication circuitries 140 of the active case 120 and the one or more communication devices 114 of the user equipment 110 whether any communication channels are broken. The broken communication channel indicates that the corresponding antenna on the user equipment 110 may have been be turned off by the user. In some embodiments, the active case 120 monitors the status of the antenna(s) on the user equipment 110 through wired connection with the user equipment 110.

The method 700 continues, in block 704, with the active case 120 detects one or more disabled communication channels. For example, when the user turns off one or one antennas (e.g., cellular, WiFi, Bluetooth, NFC, etc.) on the user equipment 110, the user equipment 110 transitions from a first mode of operation to a second mode of operation, e.g., from non-airplane mode to airplane mode, when the user turns off all RF emitters on the personal communication device. According to the mode switch of the user equipment 110, as represented by block 706, the active case 120 also enters a corresponding mode of operation, e.g., an airplane mode when the user equipment 110 switches to airplane mode.

It should be noted that the mode of operation for the active case 120 is different from the mode of operation for the user equipment 110 in accordance with some embodiments. For example, in the airplane mode for the user equipment 110, all the antennas on the user equipment 110, including but not limited to cellular, WiFi, Bluetooth, NFC, etc., are turned off; whereas in the airplane mode for the active case 120, the RF power detector associated with the active case 120 is turned on, and the antennas on the active case 120 may or may not be turned off.

In some embodiments, as represented by block 708, the RF power detector is enabled during the airplane mode to monitor RF emission, as represented by block 710. Further, as represented by block 712, the active case determines whether the RF power level detected by the RF power detector is above a threshold level. For example, as shown in FIG. 3B, the RF power detector can detect a signature of the RF energy (e.g., whether 2G, 3G, or 4G), including power level and duration of the signal burst. In some embodiments, the threshold is pre-determined based on the patterns of various communication protocols, e.g., a first threshold for 2G, a second threshold for 3G, and a third threshold for 4G, etc. In some embodiments, the threshold level is used to determine that the energy has been emitted by the one or more antennas of the second device, e.g., the power level has exceeding the threshold for the corresponding wireless transmission protocol. In some embodiments, instead of or in addition to comparing the threshold, the RF power detector performs UES L1, L2, and/or L3 detection for determining the RF signal characteristics as described above with reference to FIGS. 5A-5C and 6. Based on the RF signal characteristics, the RF power detector determines whether the user equipment is wirelessly communicating with a remote source.

In some embodiments, as represented by block 714, when the RF power detector measures the power level above a threshold, it wakes up a communication channel (e.g., the BLE channel) between the smart case 120 and the personal communication device 110. Further as presented by block 716, with BLE running or other communication channels enabled, the smart case 120 can request the personal communication device 110 to report its mode of communication, e.g., inquiring whether a communication status of the personal communication device 110 indicating that it is in an airplane mode or a mode associated with disabling one or more antennas of the personal communication device 110 and receiving the communication status from the personal communication device 110 through the communication channel.

In some embodiments, as represented by block 718, the active case 120 determines if the personal communication device 110 reports that it is in the airplane mode or the mode associated with the disabling of the one or more antennas of the personal communication device 110. In some embodiments, when the personal communication device 110 reports through the enabled communication channel that it is in the airplane mode or the mode associated with the disabling of the one or more antennas ("Yes" path from block 718), as represented by block 720, the smart case 120 determines that the personal communication device 110 has been compromised, reports the compromise (e.g., generating an alert and providing the alert to the user), and/or takes appropriate actions to stop the privacy intrusion.

On the other hand, with reference to block 722, when the personal communication device 110 reports through the enabled communication channel that it is not in the airplane mode or the mode associated with the disabling of the one or more antennas of the personal communication device 110 ("No" path from block 718), the method 700 includes exiting the smart case 120 from the airplane mode or the mode associated with the antenna(s) disabling, as represented by block 722, disabling the RF power detector to conserve energy as represented by block 724, and circling back to the portion of the method 700 represented by block 702, where the active case 120 continues to monitor the communication mode of the personal communication device 110.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at an apparatus including a housing arranged to hold a second device, a local communication device at least partially supported by the housing, and a controller coupled to the local communication device and connectable to a radio frequency (RF) power detector:
   directing the RF power detector to monitor energy emitted from one or more antennas of the second device in response to determining that the second device has transitioned from a first mode of operation to a second mode of operation, wherein the second mode of operation is different from the first mode of operation in that the one or more antennas of the second device are disabled in the second mode of operation as compared to the first mode of operation;
   receiving an indication from the RF power detector that energy has been emitted from the one or more antennas of the second device;
   establishing, via the local communication device, a communication channel between the apparatus and the second device;
   obtaining, through the communication channel, a communication status of the second device, wherein the communication status indicates that the second device is in the second mode of operation; and
   reporting compromise of the second device in accordance with a determination that the communication status indicates that the second device is in the second mode of operation and that the energy has been emitted from the one or more antennas of the second device.

2. The method of claim 1, wherein determining that the second device has transitioned from the first mode of operation to the second mode of operation includes detecting that the communication channel between the apparatus and the second device has been disabled by the second device.

3. The method of claim 1, further comprising enabling the RF power detector in response to a determination that the second device has transitioned from the first mode of operation to the second mode of operation.

4. The method of claim 1 further comprising, without user intervention, disabling the RF power detector in accordance with a determination that the communication status indicates that the second device is not in the second mode of operation.

5. The method of claim 1, wherein establishing the communication channel includes pairing the one or more antennas of the second device with one or more communication circuitries associated with the apparatus.

6. The method of claim 1, wherein obtaining, through the communication channel, the communication status of the second device includes:
   requesting, through the communication channel, the communication status from the second device; and
   receiving, through the communication channel, the communication status from the second device.

7. The method of claim 1, further comprising obtaining via the RF power detector one or more signatures of energy burst within one or more bandwidth ranges.

8. The method of claim 7, wherein determining that the energy has been emitted by the one or more antennas of the second device includes:
   obtaining a waveform of the energy, including dividing the waveform based on the one or more bandwidth ranges;
   comparing the waveform with the one or more signatures; and
   deriving characteristics of the energy based on the comparison.

9. The method of claim 1, wherein reporting compromise of the second device includes sending characteristics of the energy to a remote device, and the method further includes:
   receiving a command from the remote device to activate or de-activate the second device; and
   triggering activation or de-activation of the second device in accordance with the command.

10. An apparatus comprising:
    a housing arranged to hold a second device;
    a local communication device, at least partially supported by the housing, connectable to the second device; and
    a controller, coupled to the local communication device, is operable to receive a mode of operation from the second device via the local communication device, wherein:
    the controller is connectable to a radio frequency (RF) power detector and operable to direct the RF power detector to monitor one or more antennas of the second device in response to determining that the second device has transitioned from a first mode of operation to a second mode of operation, wherein the second mode of operation is different from the first mode of operation in that the one or more antennas of the second device are disabled in the second mode of operation as compared to the first mode of operation;
    the controller is further operable to:
    receive an indication from the RF power detector that energy has been emitted from the one or more antennas of the second device;
    direct the local communication device to establish a communication channel between the apparatus and the second device;
    obtain, through the communication channel, a communication status of the second device, wherein the communication status indicates that the second device is in the second mode of operation; and
    report compromise of the second device in accordance with a determination that the communication status indicates that the second device is in the second mode of operation and that the energy has been emitted from the one or more antennas of the second device.

11. The apparatus of claim 10, wherein the RF power detector is at least partially supported by the housing and coupled to the controller.

12. The apparatus of claim 10, wherein a supplemental functional device includes the RF power detector and the supplemental functional device is attachable to the housing and connectable to the controller.

13. The apparatus of claim 10, wherein the RF power detector includes:
    a frontend module, operable to detect and receive the energy emitted from the one or more antennas of the second device;
    a circuitry coupled to the frontend module, operable to perform data conversion of the energy received by the frontend module and process the converted data; and a microcontroller, coupled to the circuitry and connectable to the controller, operable to direct the circuitry to perform the data conversion and exchange data with the controller.

14. The apparatus of claim 13, wherein the microcontroller is operable to receive the data conversion of the energy from the circuitry and scan an RF spectrum of the energy to identify characteristics of the energy, including signal protocols.

15. The apparatus of claim 10, wherein the local communication device includes at least one antenna, operable to exchange RF signals with the one or more antennas of the second device.

16. The apparatus of claim 10, further comprising a remote communication device, coupled to the controller and connectable to a remote device, operable to send characteristics of the energy to the remote device and receive a command from the remote device to be executed on the second device.

17. The apparatus of claim 10, wherein the controller is operable to enable the RF power detector in response to determining that the second device has transitioned from the first mode of operation to the second mode of operation.

18. The apparatus of claim 10, wherein the controller is operable to disable the RF power detector in accordance with a determination that the communication status indicates that the second device is not in the second mode of operation.

19. The apparatus of claim 10, wherein the local communication device is operable to determine that the second device has transitioned from the first mode of operation to the second mode of operation based on detecting the communication channel between the apparatus and the second device has been disabled by the second device.

20. The apparatus of claim 10, wherein the controller is operable to obtain a waveform of the energy from the RF power detector and comparing the waveform with one or more signatures to derive characteristics of the energy.

* * * * *